United States Patent
Hanke et al.

(10) Patent No.: US 11,113,676 B2
(45) Date of Patent: Sep. 7, 2021

(54) BLOCK MINING METHODS AND APPARATUS

(71) Applicant: Top Galore Limited, Tortola (VG)

(72) Inventors: Timo Tobias Hanke, Austin, TX (US); Sergio Demian Lerner, Cuidad de Buenos Aires (AR)

(73) Assignee: Top Galore Limited, Tortola (VG)

(*) Notice: Subject to any disclaimer, the term of this patent is extended or adjusted under 35 U.S.C. 154(b) by 514 days.

(21) Appl. No.: 15/141,063

(22) Filed: Apr. 28, 2016

(65) Prior Publication Data
US 2017/0243176 A1    Aug. 24, 2017

Related U.S. Application Data

(63) Continuation of application No. PCT/US2014/066470, filed on Nov. 19, 2014.

(60) Provisional application No. 61/906,310, filed on Nov. 19, 2013.

(51) Int. Cl.
*G06Q 20/06* (2012.01)
*G06Q 20/38* (2012.01)

(52) U.S. Cl.
CPC ..... *G06Q 20/0655* (2013.01); *G06Q 20/0658* (2013.01); *G06Q 20/3827* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,892,900 A * | 4/1999 | Ginter | ............ | G06F 21/10 726/26 |
| 6,097,811 A * | 8/2000 | Micali | ............ | G06F 21/33 713/158 |
| 7,359,846 B1 * | 4/2008 | Fernandez | ............ | G06F 30/3312 703/13 |
| 7,599,489 B1 * | 10/2009 | Spracklen | ............ | H04L 9/0643 380/28 |
| 9,495,668 B1 * | 11/2016 | Juels | ............ | G06Q 20/06 |
| 2011/0142228 A1 * | 6/2011 | Crispin | ............ | G06F 9/3895 380/28 |
| 2011/0145137 A1 | 6/2011 | Driemeyer et al. | | |

(Continued)

OTHER PUBLICATIONS

Dadda et al. (NPL 2004) The Design of a High Speed ASIC Unit for the Hash Function SHA-256 (Year: 2004).*

(Continued)

*Primary Examiner* — Zeshan Qayyum
*Assistant Examiner* — Eduardo Castilho
(74) *Attorney, Agent, or Firm* — Dergosits & Noah LLP; Todd A. Noah

(57) ABSTRACT

Block chain mining methods and apparatus. A mid-state generator develops a plurality, n, of mid-states by selectively varying a portion of the block, and, in particular, the block header. A single message expander develops a message schedule by expanding a message in accordance with a predetermined expansion function; and the message schedule is shared with a plurality, n, of compressors, each developing a result as a function of the message schedule and a respective one of the n unique mid-states in accordance with a predetermined compression function. The compressors can be either rolled core or pipelined core.

12 Claims, 10 Drawing Sheets

(56) References Cited

U.S. PATENT DOCUMENTS

| | | | | |
|---|---|---|---|---|
| 2011/0238636 | A1* | 9/2011 | Shirai | H04L 9/0643 707/693 |
| 2011/0246774 | A1* | 10/2011 | Phillips, II | H04L 63/0442 713/168 |
| 2011/0307659 | A1* | 12/2011 | Hans | G06F 3/0613 711/114 |
| 2012/0158736 | A1* | 6/2012 | Milby | G06F 16/2255 707/747 |
| 2013/0332743 | A1* | 12/2013 | Gueron | H04L 9/0643 713/189 |
| 2014/0093069 | A1* | 4/2014 | Wolrich | G09C 1/00 380/28 |
| 2015/0043729 | A1* | 2/2015 | Gopal | H04L 9/0643 380/29 |
| 2016/0125040 | A1* | 5/2016 | Kheterpal | G06Q 20/3827 707/776 |

OTHER PUBLICATIONS

Bitcoin: A Peer-to-Peer Electronic Cash System (Satoshi Nakamoto / NPL Retrieved Jul. 4, 2010) (Year: 2010).*

Naik, Raul: Optimising the SHA256 Hashing Algorithm for Faster and More Efficient Bitcoin Mining / Master Thesis UCL Department of Computer Science / Sep. 2, 2013 (Year: 2013).*

Xu et al., "Half-Fast" Bitcoin Miner: Open-Source Bitcoin Mining with FPGA, retrieved from Google Scholar, cached May 15, 2014 (Year: 2014).*

Hu et al. High Throughput Implementation of MD5 Algorithm on GPU Ubiquitous InformationTechnologies & Applications, 2009 ICUT'09. Proceedings of the 4th International Converence on IEEE, 2009 (Year: 2009).*

Pal et al. PARSHA-256—A New Parallelizable Hash Function and a Multi threaded Implementation. International Workshop on Fast Software Encryption, Springer, Berlin, Heidelberg, 2003 (Year: 2003).*

Atighehchi et al. Generic Parallel Cryptography for Hashing Schemes. IEEE 12th International Symposium on Parallel and Distributed Computing, ISPDC 2013, Bucharest, Romania, Jun. 27-30, 2013. IEEE 2013 (Year: 2013).*

Dotemoto, Philip. FPGA Based Bitcoin Mining, California Polytechnic State University, Jun. 2014 (Year: 2014).*

Dev, Jega. Bitcoin Mining acceleration and performance quantification. May 1, 2014. Department of Computer Science and Engineering College of Engineering, Guindy, Anna University, Chennai, India (Year: 2014).*

Atighehschi et al. An Efficient Parallel Algorithm for Skein Hash Functions Jan. 2010Proceedings of the IASTED International Conference on Parallel and Distributed Computing and Systems 2010 (Year: 2010).*

Ho, Calvin. Adaptation of All-Programmable SoC to Hardware Bitcoin Miners and Mining Servers. Jan. 2014. California State University, Northridge (Year: 2014).*

International Preliminary Report on Patentability for International Application No. PCT/US2014/066470, dated May 14, 2016.

Written Opinion of the International Searching Authority for International Application No. PCT/US2014/066470, dated Feb. 23, 2015.

International Search Report for International Application No. PCT/US2014/066470, dated Feb. 23, 2015.

Office Action for Chinese Patent Application No. 201480073590.9, dated Jan. 29, 2018.

Office Action for Chinese Patent Application No. 201480073590.9, dated Nov. 24, 2017.

European Search Opinion for European Application No. 14864642.5, dated Aug. 8, 2017.

* cited by examiner

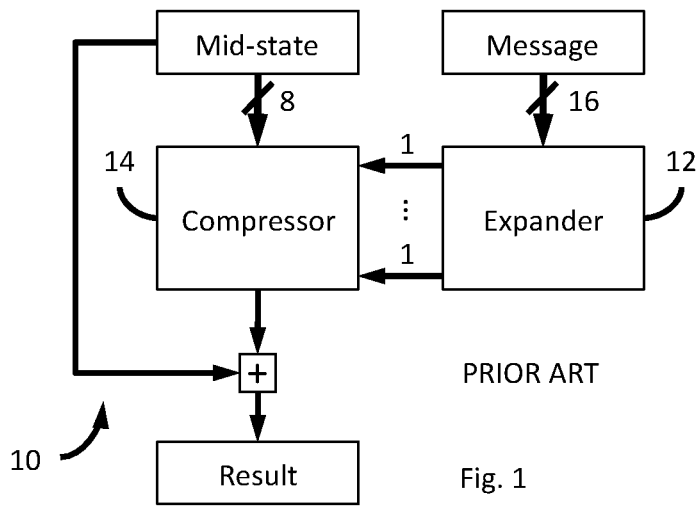
PRIOR ART Fig. 1
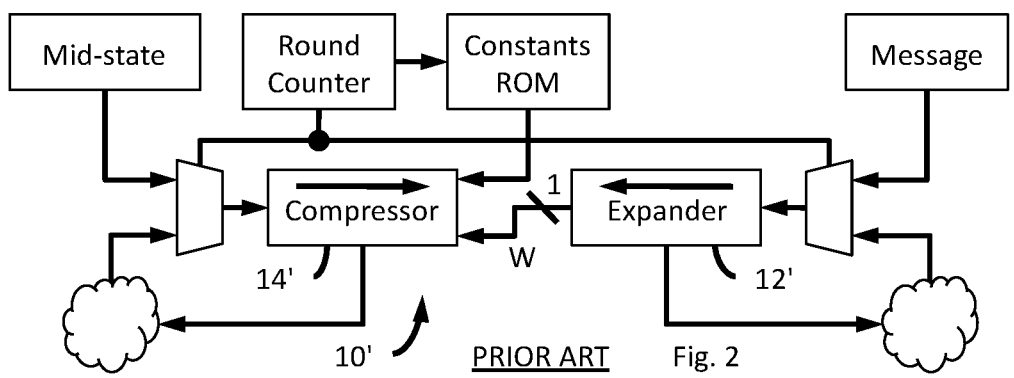
PRIOR ART Fig. 2
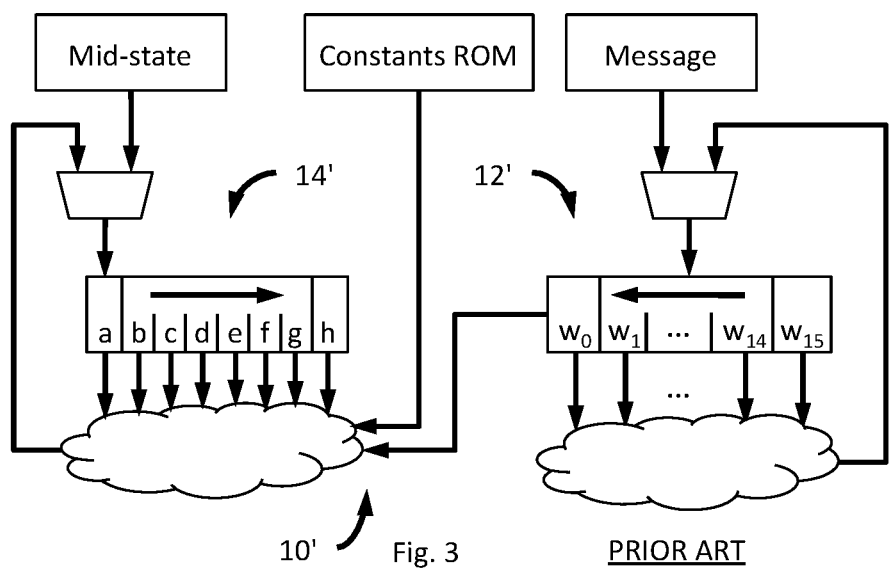
Fig. 3 PRIOR ART

| Block[0] | | | Block[1] | | | |
|---|---|---|---|---|---|---|
| Version | Hash | Merkle | Timestamp | | Target | Nonce |
| 4 | 32 | 28 | 4 | 4 | 4 | 4 |

Fig. 6: Block Header     PRIOR ART

BLOCK MINING METHODS AND APPARATUS

CROSS REFERENCE TO RELATED APPLICATIONS

This application is a Continuation of International Application No. PCT/US14/66470, filed 19 Nov. 2014 ("Parent Application"). This application is related to Provisional Application Ser. No. 61/906,310, filed 19 Nov. 2013 ("Parent Provisional"), the subject matter of which, in its entirety, is expressly incorporated herein by reference, and hereby claims benefit of the filing date thereof pursuant to 37 CFR § 1.78(a)(4).

BACKGROUND OF THE INVENTION

Field of the Invention

The present invention relates to both methods and apparatus for use in mining a block, e.g., in a block chain, and, in particular, to methods and apparatus for use in a crypto currency system, such as the Bitcoin mining system.

Description of the Related Art

In general, in the descriptions that follow, we will italicize the first occurrence of each special term of art that should be familiar to those of ordinary skill in this art. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states. For convenience of reference, we will use the term "set" to mean a collection of zero, one or more than one items, as the context may require.

In general, a decentralized network can store and reference common information in a block chain. In a typical block chain, each block contains units of information commonly called transactions that arise roughly at the same time. Using a predefined protocol, blocks are linked by having their hash values inserted into a designated field in the next sequential block in the block chain.

The process of block chain mining is designed to allow the system to come to a consensus in which all nodes in the computer network agree to the same block chain. Several block chain systems have been proposed, and some are presently in operation. One of the earliest and, currently, the most widely recognized is the Bitcoin system. According to the Bitcoin protocol, the first miner to successfully compute a valid proof-of-work for a block candidate is entitled to add the block to the block chain (sometimes referred to as the ledger), and to generate new units of the crypto currency as a reward.

The proof-of-work for a block consists of a nonce value that, when inserted into a designated field in the block, makes the cryptographic hash value of the block meet a certain difficulty target. Since a cryptographic hash function behaves practically as a random oracle, no better approach to finding a valid nonce has yet been discovered than simple trial-and-error. The mining process is therefore a stochastic process. In practice, the chances of a particular miner successfully solving a block are, at any particular point in time, proportional to the miner's hash rate relative to the hash rate of the whole network.

As is known, the U.S. National Security Agency ("NSA") has designed and published a set of cryptographic hash functions referred to as Secure Hash Algorithms ("SHA"). In particular, the Bitcoin protocol applies the SHA-256, described in the following pseudocode:

```
**********
Note 1: All variables are 32 bit unsigned integers and addition is
    calculated modulo 2^32
Note 2: For each round, there is one round constant k[i] and one entry
    in the message schedule array w[i], 0 ≤ i ≤ 63
Note 3: The compression function uses 8 working variables, a through h
Note 4: Big-endian convention is used when expressing the constants in
    this pseudocode, and when parsing message block data from bytes to
    words, for example, the first word of the input message "abc" after
    padding is 0x61626380
Initialize hash values: (first 32 bits of the fractional parts of the
    square roots of the first 8 primes 2..19)
h0 := 0x6a09e667;
h1 := 0xbb67ae85;
h2 := 0x3c6ef372;
h3 := 0xa54ff53a;
h4 := 0x510e527f;
h5 := 0x9b05688c;
h6 := 0x1f83d9ab;
h7 := 0x5be0cd19;
Initialize array of round constants: (first 32 bits of the fractional
    parts of the cube roots of the first 64 primes 2..311)
k[0..63] :=
    0x428a2f98, 0x71374491, 0xb5c0fbcf, 0xe9b5dba5, 0x3956c25b,
    0x59f111f1, 0x923f82a4, 0xab1c5ed5, 0xd807aa98, 0x12835b01,
    0x243185be, 0x550c7dc3, 0x72be5d74, 0x80deb1fe, 0x9bdc06a7,
    0xc19bf174, 0xe49b69c1, 0xefbe4786, 0x0fc19dc6, 0x240ca1cc,
    0x2de92c6f, 0x4a7484aa, 0x5cb0a9dc, 0x76f988da, 0x983e5152,
    0xa831c66d, 0xb00327c8, 0xbf597fc7, 0xc6e00bf3, 0xd5a79147,
    0x06ca6351, 0x14292967, 0x27b70a85, 0x2e1b2138, 0x4d2c6dfc,
    0x53380d13, 0x650a7354, 0x766a0abb, 0x81c2c92e, 0x92722c85,
    0xa2bfe8a1, 0xa81a664b, 0xc24b8b70, 0xc76c51a3, 0xd192e819,
    0xd6990624, 0xf40e3585, 0x106aa070, 0x19a4c116, 0x1e376c08,
    0x2748774c, 0x34b0bcb5, 0x391c0cb3, 0x4ed8aa4a, 0x5b9cca4f,
    0x682e6ff3, 0x748f82ee, 0x78a5636f, 0x84c87814, 0x8cc70208,
    0x90befffa, 0xa4506ceb, 0xbef9a3f7, 0xc67178f2;
Pre-processing:
append the bit '1' to the message;
append k bits '0';
    where k is the minimum number >= 0 such that the resulting message
        length (modulo 512 in bits) is 448
append length of message;
    (without the '1' bit or padding), in bits, as 64-bit big-endian
        integer (this will make the entire post-processed length a
        multiple of 512 bits)
Process the message in successive 512-bit chunks:
break message into 512-bit chunks;
for each chunk:
{
    create a 64-entry message schedule array w[0..63] of 32-bit words;
        (The initial values in w[0..63] don't matter, so many
            implementations zero them here)
    copy chunk into first 16 words w[0..15] of the message schedule
        array;
    Expand the first 16 words into the remaining 48 words w[16..63] of
        the message schedule array:
    for i from 16 to 63:
        s0 := (w[i-15] rightrotate 7) xor (w[i-15] rightrotate 18) xor
            (w[i-15] rightshift 3);
        s1 := (w[i-2] rightrotate 17) xor (w[i-2] rightrotate 19) xor
            (w[i-2] rightshift 10);
        w[i] := w[i-16] + s0 + w[i-7] + s1;
    Initialize working variables to current hash value:
    a := h0;
    b := h1;
```

-continued

```
    c := h2;
    d := h3;
    e := h4;
    f := h5;
    g := h6;
    h := h7;
Compression function main loop:
for i from 0 to 63:
    {
        S1 := (e rightrotate 6) xor (e rightrotate 11) xor (e rightrotate 25);
        ch := (e and f) xor ((not e) and g);
        temp1 := h + S1 + ch + k[i] + w[i];
        S0 := (a rightrotate 2) xor (a rightrotate 13) xor (a rightrotate 22);
        maj := (a and b) xor (a and c) xor (b and c);
        temp2 := S0 + maj;
        h := g;
        g := f;
        f := e;
        e := d + temp1;
        d := c;
        c := b;
        b := a;
        a := temp1 + temp2;
    }
    Add the compressed chunk to the current hash value:
    h0 := h0 + a;
    h1 := h1 + b;
    h2 := h2 + c;
    h3 := h3 + d;
    h4 := h4 + e;
    h5 := h5 + f;
    h6 := h6 + g;
    h7 := h7 + h;
}
Produce the final hash value (big-endian):
digest := hash := h0 append h1 append h2 append h3 append h4 append h5
    append h6 append h7
**********
```

Hereinafter, for convenience of reference, we may refer to aspects of our invention using the terminology set forth above in the pseudocode. Also, by way of example, we will focus our disclosure on the Bitcoin protocol, although we recognize that other crypto currency systems may benefit from our invention.

Many hash functions, including the SHA-1, SHA-2 and RIPEMD families, share a similar scheme with SHA-256. Each applies an expansion function (sometimes referred to as an expansion operation) adapted to expand an input message into a message schedule, and then applies a compression function (sometimes referred to as a compression operation) adapted to compress the message schedule into a hash value or result (sometimes referred to as the message digest or simply digest). Typically, the compression function is recursive, compressing one word of the message schedule per round. The recursive nature of these functions lends itself to known loop unrolling techniques and, when applied to hardware implementations, results in a classic pipelined configuration of computational elements.

Usually, when a hash is computed within Bitcoin, it is computed twice, i.e., a SHA-256 hash of a SHA-256 hash (sometimes referred to as a double-SHA, or simply $SHA^2$). Most of the time only SHA-256 hashes are used, for example when hashing transactions and block headers. However, RIPEMD-160 is also used for the second hash when a shorter hash digest is desirable, e.g., when hashing a public key to obtain a Bitcoin address.

Block chain mining is, by design, competitive in nature. The monetary reward is proportional to the number of blocks solved, which is in turn proportional to the hash rate relative to the hash rate of the entire network. As competition has increased, miners are aggressively seeking even small improvements in hash rate. One known approach to improve hash rate is to scatter the hash search across the greatest number of hash engines, each adapted to independently search a respective portion of the entire nonce-space for hashes that satisfy (i.e., are below) the required difficulty target.

Often, when a hash is computed within Bitcoin, the message being hashed is of a fixed length. This is the case for example for block headers (80 bytes) and whenever a hash value (32 bytes) is itself being hashed. Hash values are being hashed in all applications of double-SHA. In the formation of a Merkle tree hash value pairs (64 bytes) arranged in a tree data structure are being hashed. In general, hash engines adapted to hash fixed length messages may be optimized differently than are hash engines adapted to hash arbitrary length messages.

When implementing a hash engine in an application specific integrated circuit ("ASIC"), the key design goals are to improve power, performance and area. When many messages of the same short length have to be hashed, a pipelined implementation of a hash core is possible. By way of example, FIG. 1 shows one block of such a PRIOR ART pipeline. In a typical ASIC, several such pipeline blocks are instantiated and adapted to operate, either in parallel or serially, under the control of a central control unit, which may be a conventional microprocessor unit ("MPU") or a special controller (not shown) instantiated on the same ASIC.

In block chain mining, many messages (blocks) are being hashed that differ only in the last chunk (i.e, the portion containing the nonce). For that specific type of application, the mid-state of the compressor (i.e., the hardware component that performs the compression function) can be pre-computed as far as it does not depend on the nonce. Then, for the last application of the compressor that does depend on the nonce, the pipelined core 10 as in FIG. 1 may be employed. In FIG. 1, we have used conventional notation to indicate bus widths, with units expressed as 32-bit double-words ("dwords"). Sometimes, depending on the context, the compressor 14 may be referred to as a semi-hasher and the combination of the expander 12 and the compressor 14 as a full-hasher. For the purposes of our invention, we submit that the core 10 can be instantiated in either a pipelined or rolled form.

We have illustrated in FIG. 2 the basic hardware architecture of a PRIOR ART rolled core 10'. Typically, in such an architecture, approximately 67 cycles are required to compute one SHA-256 round, comprising 64 computation cycles plus a few additional cycles to load the registers with initial values. Often, the read-only-memory ("ROM") of constants is shared among several cores 10'. In general, a PRIOR ART special purpose rolled core 10' may be conceptualized as illustrated in FIG. 3 wherein the hash computational hardware is depicted as a cloud of combinational logic. A more highly structured, PRIOR ART $SHA^2$ pipelined core 10 is illustrated by way of example in FIG. 4. In FIG. 5, we have illustrated a high-level representation of a typical Bitcoin $SHA^2$ engine 16.

Shown in FIG. 6 is the format of a Bitcoin Block Header wherein the indicated field sizes are expressed in 8-bit bytes. As can be seen, at offset 36, the 32-byte Merkle Root field spans the boundary between Block[0] (sometimes referred to simply as "$B_0$") and Block[1] ("$B_1$") of the block header. By way of example, we have illustrated in FIG. 7 a 3-level Merkle tree having a leaf set comprising 4 transactions, although it will be recognized that a typical Merkle tree may have additional hierarchical hash levels depending on the number of transactions being hashed. In FIG. 8 we have shown, for convenience of reference, a typical 3-block sequence within a Bitcoin block chain, wherein each block comprises a block header (see, FIG. 6) and a respective set of transactions (in clear text to facilitate block browsing). In situations where the number of available transactions is less than a power-of-two, padding, e.g., duplicate or dummy transactions, is added at the leaf level to complete the power-of-two tree structure. In accordance with the Bitcoin protocol, the first transaction of every block is always a generation (or coinbase) transaction generated by the miner who added the block to the chain.

As we explained in our Provisional Application, it has been proposed to partition the 4-byte Version field in the block header (see, FIG. 6) and use, e.g., the high 2-byte portion as additional nonce range. Alternatively, the Bitcoin specification defines an extraNonce field in the format for the coinbase or generation transaction (see, FIG. 16*b*). However, the Bitcoin specification recognizes that incrementing the extraNonce field entails recomputing the Merkle tree, as the coinbase transaction is the left most leaf node. In this approach, each time the extraNonce is incremented, a full Merkle root is generated, thus requiring the full block header to be reprocessed.

One problem that we perceive with current hardware platform designs is the requirement that each hash core be adapted to perform the full SHA-256 independently of all of the other hash cores in the hardware instantiation. What is needed is a method and apparatus that allows a single expander instant to be shared by a plurality of compressor instants.

BRIEF SUMMARY OF THE INVENTION

In one embodiment of our invention, we provide a method for mining a block comprising a block header, as a function of a selected hash function applied on the block header, the selected hash function comprising an expansion operation and a compression operation. In accordance with our method, we first develop a plurality, m, of mid-states, each as a function of selectively varying a selected first portion of the block header. We then perform the expansion operation on a selected second portion of the block header to produce a message schedule. Finally, for each of the m mid-states, we perform the compression operation on the mid-state and the message schedule, to produce a respective one of m results.

In one other embodiment, we provide apparatus configured to perform our block mining method.

In yet another embodiment, our method for block mining can be embodied in a computer readable medium including executable instructions which, when executed in a processing system, causes the processing system to perform the steps of our method.

BRIEF DESCRIPTION OF THE SEVERAL VIEWS OF THE DRAWINGS

Our invention may be more fully understood by a description of certain preferred embodiments in conjunction with the attached drawings in which:

FIG. 1 illustrates, in block diagram form, a PRIOR ART special purpose SHA pipeline;

FIG. 2 illustrates, in block diagram form, a PRIOR ART special purpose SHA rolled core;

FIG. 3 illustrates, in block diagram form, another PRIOR ART special purpose SHA rolled core;

FIG. 6 illustrates, in tabular form, the format of a Bitcoin Block Header;

FIG. 15, comprising

FIG. 16, comprising

Figure 4:
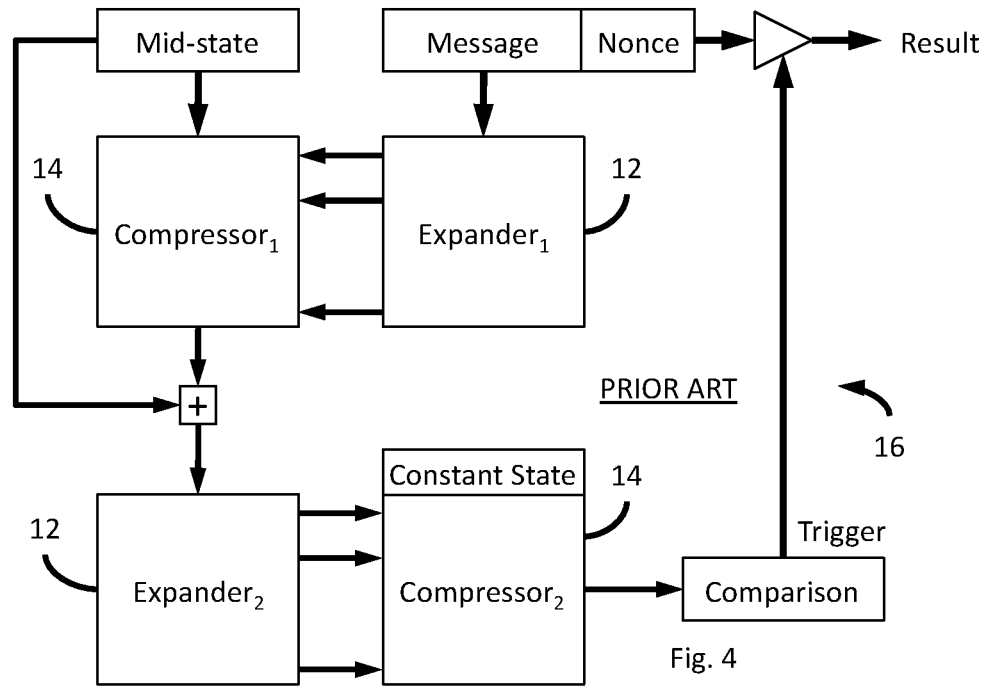
FIG. 4 illustrates, in block diagram form, a PRIOR ART Bitcoin SHA$^2$ hash engine having a pipelined core.
Figure 5:
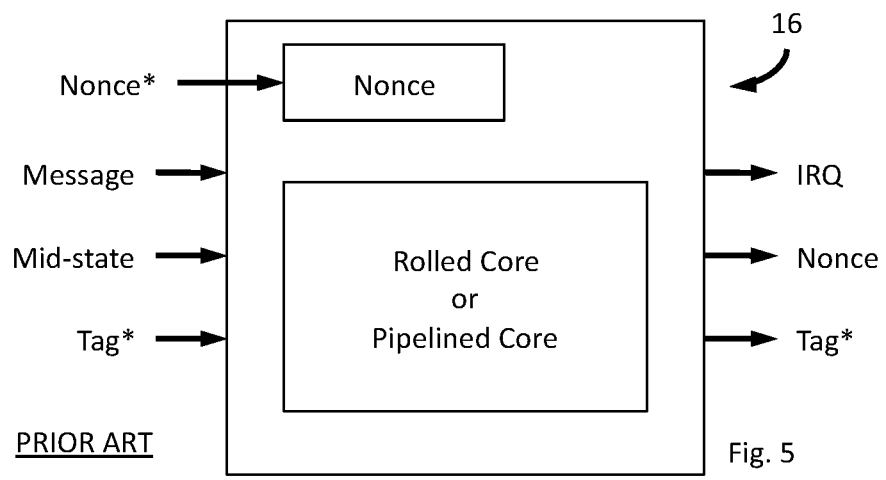
FIG. 5 illustrates, in block diagram form, a PRIOR ART Bitcoin SHA$^2$ hash engine having either a rolled core or a pipelined core.
Figure 7:
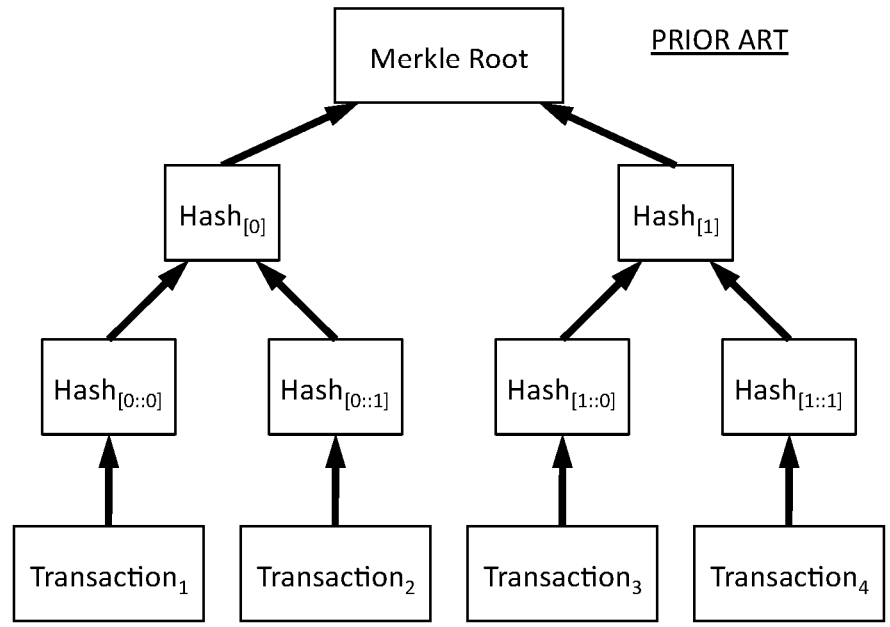
FIG. 7, illustrates, in block diagram form, a multi-tier Merkle tree as employed in the Bitcoin protocol.
Figure 8:
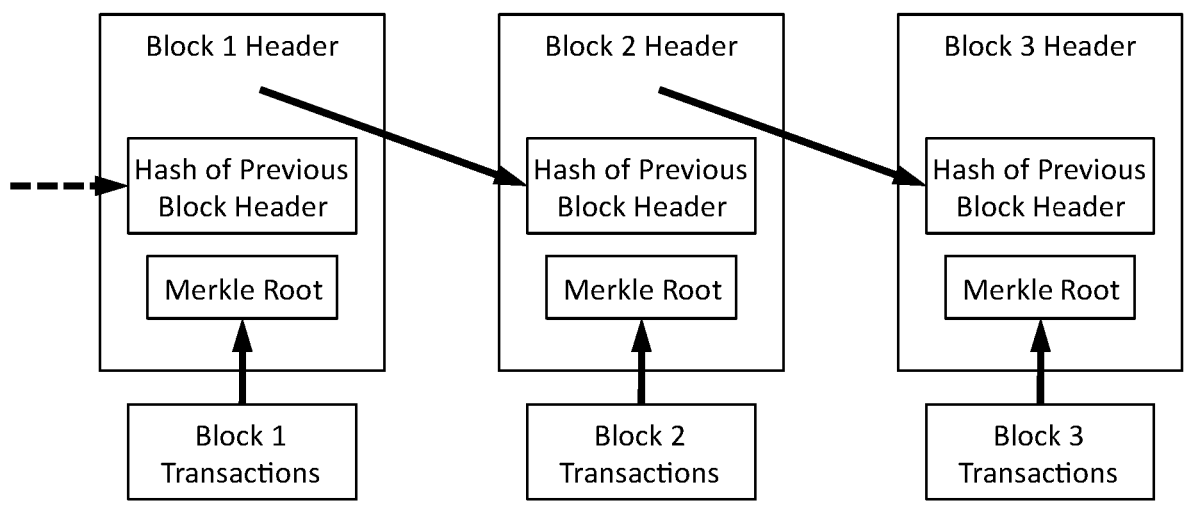
FIG. 8 illustrates, in block diagram form, the general format for Bitcoin blocks comprising a block chain.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 9:
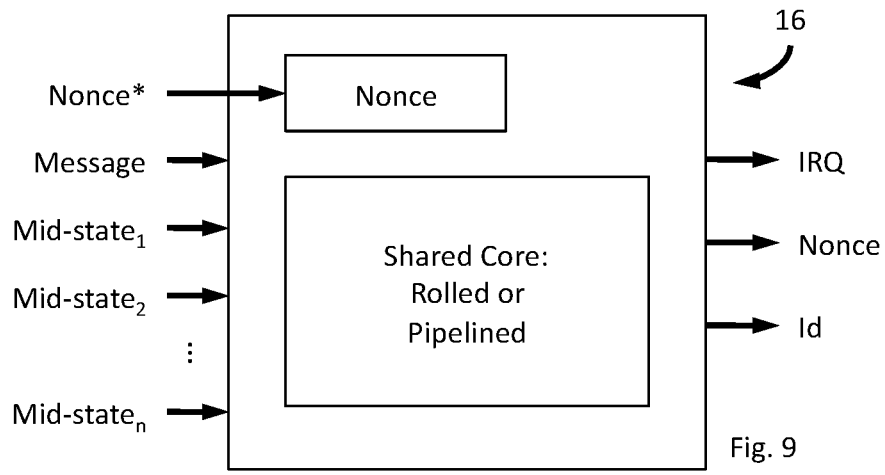
FIG. 9 illustrates, in block diagram form, a Bitcoin SHA$^2$ hash engine constructed in accordance with our invention as disclosed in our Provisional Application.
Figure 10:
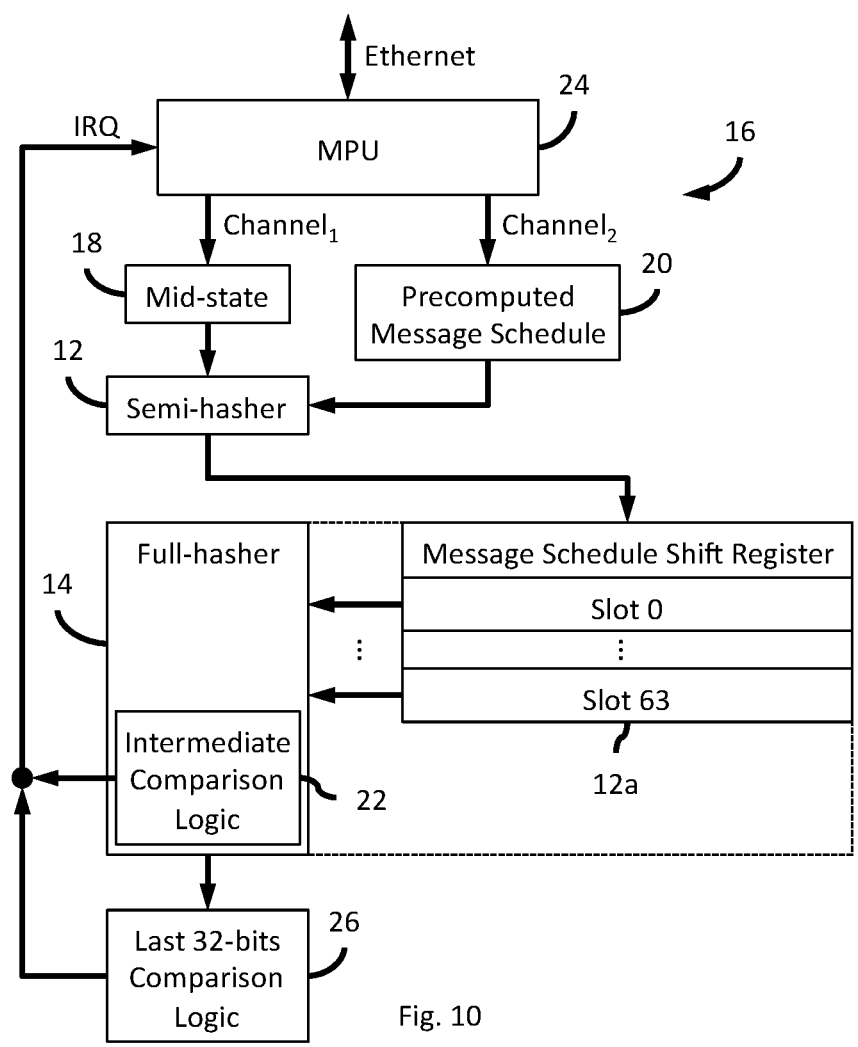
FIG. 10 illustrates, in block diagram form, one possible hardware implementation in accordance with our invention as disclosed in our Provisional Application.

FIG. 9 illustrates, in high-level form, a Bitcoin SHA$^2$ hash engine 16 constructed in accordance with our invention as disclosed in our Provisional Application. In FIG. 10, we present a basic implementation of our invention as we disclosed in our Provisional Patent. The preferred embodiment is instantiated in the form of an ASIC that instantiates a hash engine 16' containing a selected plurality, e.g., 200, SHA-256 semi-hashers 12, and a corresponding plurality of full SHA-256 hashers 14. Each semi-hasher 12 is pipelined with a respective full-hasher 14. Each hasher pipeline, which combines one semi-hasher 12 with one full-hasher 14, outputs one $SHA^2$ result per clock tick. Each semi-hasher 12 has a 32-byte mid-state register 18 which contains a pre-computed mid-state, and a 64*4 byte pre-computed message schedule register 20 which contains a pre-computed message schedule; and all SHA rounds are unrolled and implemented in hardware. As is conventional, each full-hasher 14 contains the message schedule creation logic to derive the message schedule from the input block on each clock tick; and, also, rounds are unrolled. A message schedule shift register 12a is adapted to perform similar to an expander pipeline to develop the message schedule of an input block sequentially in a 64-deep push-down stack of 16 dwords sliding windows (sometimes referred to as slots), where each new dword of the message enters at the top and the oldest dword is removed at the bottom. In operation, each sliding window is pushed down to the next-deeper slot to follow the hash round corresponding with the slot. At round 61 of the full-hasher 14, we provide a special intermediate comparison logic module 22 that checks for a solution to the block before all 64 rounds are performed. If the solution is found, an interrupt ("IRQ") is raised; optionally, all full-hashers 14 may be allowed to continue searching for additional solutions, or may be stopped to conserve power. An external microprocessor ("MPU") 24 handles the exception, reads the full-hasher 14 outputs, and finds the one that solved the block. Further, we provide a last-32-bits checker 26 to facilitate reuse of the hasher pipeline for the pre-computation.

In accordance with one embodiment of our invention, we propose directly to selectively vary the 28-byte portion of the Merkle root that lies in Block[0] (see, FIG. 6). Our method requires that the miner first perform a preparation stage where many different valid Merkle roots are constructed. However, in contrast with the usual approach, our goal is to find a number of candidate Merkle roots that end with the same 4-byte pattern. For example, one way is to select a predetermined, fixed pattern (e.g., 4 zero bytes). Another way is to store the Merkle root candidates for each pattern until enough candidate roots ending with a desired pattern are found.

Figure 11:
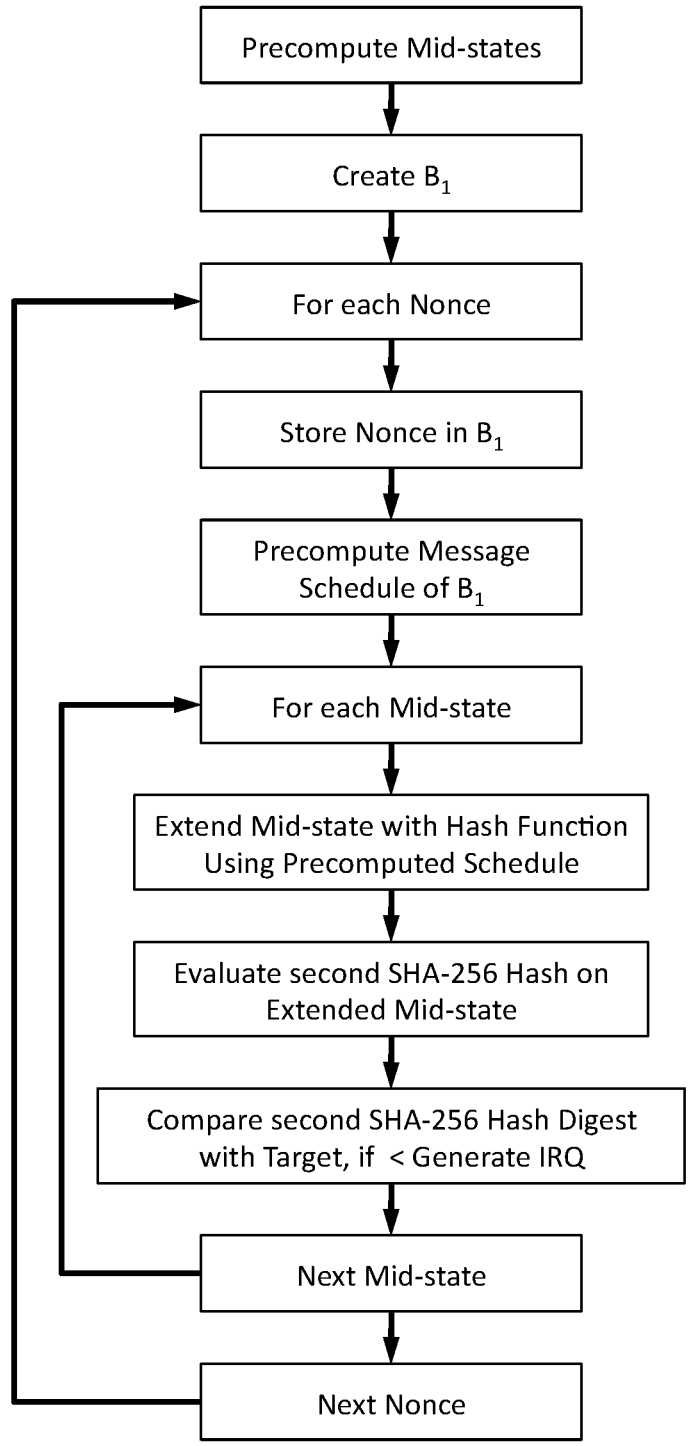
FIG. 11 illustrates, in logic flow diagram form, one possible method for operating the embodiment of FIG. 10, as also disclosed in our Provisional Application.

The functional flow of operation of our hash engine 16', as we described in our Provisional Application, is illustrated in FIG. 11. In pseudocode form (with indentation indicating a for-loop structure), here is how it works:

**********
1. Pre-compute s mid-states $MS_0,...,MS_{s-1}$ by applying the first chunk processing of SHA to a block header modified by setting the Merkle-roots field to each of the s Merkle-roots $MR_0,...,Mr_{s-1}$.
2. Create B1 with the first 32 bits of B1 set to the fixed pattern that all MR_i have in common in their respective last 4 bytes. Set the other fields of B1 ("bits" and "time") to the appropriate values.
3. For each nonce v,
  3.1. Store the nonce in $B_1$ and pre-compute the message schedule $W_v$ for $B_1$.
  3.1. For each i from 0 to s-1:
    3.1.1. Complete the mid-state $MS_i$ to a full SHA execution using the pre-computed message schedule $W_v$ to obtain the intermediate digest $T_{i,v}$.
    3.1.2. Apply the second SHA operation to $T_{i,v}$ to obtain the double-SHA digest $D_{i,v}$.
    3.1.3. Compare $D_{i,v}$ with target (if last round optimization is in use, the comparison is done within the second SHA execution engine).
**********

To quickly enumerate many valid candidate roots, one way to construct them is by incrementing the extraNonce field and recomputing the parent node hashes up the tree to the root node. One other way is by rearranging the sub-trees of the Merkle tree by swapping child nodes (e.g., left with right), and recomputing parent nodes until the root node; this approach could include permuting the transaction leafs. Each time a new candidate root is computed, it's checked against the desired pattern, and, if it does not match, the candidate root is discarded, otherwise it is stored. As we noted in our Provisional Application, this technique requires the miner to perform approximately $s*2^32*1 \log 2(Q)$ $SHA^2$ hash digests to obtain s elements of equal ending, when there are Q transactions to include in the Merkle-tree.

As explained in our Provisional Application, we propose to achieve greater performance by combining two sets of pre-generated Merkle sub-trees (although a dynamically generated Merkle sub-tree can be combined, we have found this to be generally worse). Our preparation stage is performed in three steps:

1. In the first step of our preparation stage, we develop $K_1$ node hashes by selectively rearranging the set of transactions in the Merkle-tree, or, perhaps, by choosing different sets of transactions from the pool of all pending transactions. This can be accomplished in approximately $(K_1+1)*\log 2(\#Q_1)$ $SHA^2$ operations, where $Q_1$ is a set of transaction hashes and $\#Q_1$ the number of transactions hashes in the set (i.e., leaf nodes), since once a tree for $Q_1$ transactions has been built, then a new root can be obtained by swapping child nodes, and computing each parent node requires on average $\log 2(Q1)$ $SHA^2$ hash digests. Only the parent node hashes need to be saved, and the actual trees can be later removed from memory.
2. In the second step of our preparation stage, we develop a set of $K_2$ parent node hash digests of a set of node sub-trees, where the set of transactions is $Q_2$ and the number of transactions (leaf nodes) is $\#Q_2=\#Q_1$ (as noted above, this is always possible since Bitcoin Merkle roots use duplicate transaction hashes to fill empty nodes of the tree). Note that the sets $Q_1$ and $Q_2$ do not intersect, and any ordering of transactions created by the concatenation of an ordering of $Q_1$ with any ordering of $Q_2$ must be a valid ordering of transactions. Note, also, that almost all possible orders of the $Q_1$ transactions are generally valid since most miners do not generate blocks which have transactions that depend on other transactions in the block (the only exception is that the generation transaction is always the first).

For $Q_1$, there are $(\#Q_1-1)!$ number of possible candidate roots of the left sub-trees (there are 3628800 possible orderings).

For $Q_2$, for simplicity, we can assume that there are no repeated transaction hashes (i.e., $\#Q_1+\#Q_2$ is a power of two). It follows therefore that there are $(\#Q_2)!$ number of possible candidate roots of the right sub-trees. If we take $\#Q_1=\#Q_2=11$, then there are at least $2^46$ possible candidate roots that can be computed easily by combining an element from the left set with an element from the right set. Note that $K_1$ and $K_2$ need not to be that large, and can represent a small subset of the possible orderings, and use higher values of $\#Q_1$ and $\#Q_2$.
3. In the third step of our preparation state (which is generally performed, e.g., by our hash engine 16'), the hashes of one parent of the first set are iteratively combined with a parent of the second set (one left node with a right node), and then $SHA^2$ hashed to obtain the root node hash. Each combination requires only obtaining 2 hashes from tables and performing the $SHA^2$ operations.

Figure 12:
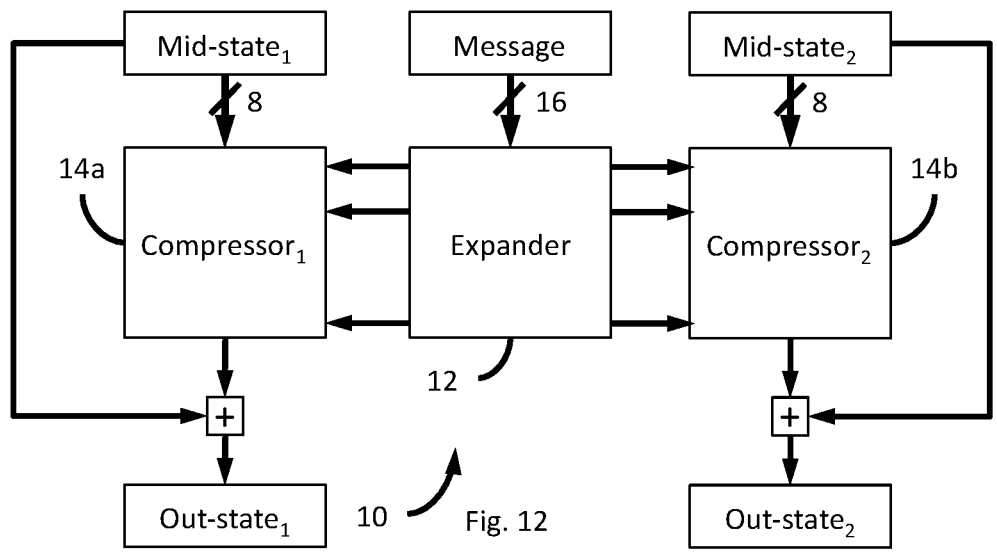
FIG. 12 illustrates, in block diagram form, one possible parallel, message schedule sharing embodiment in accordance with our invention as disclosed in our Provisional Application.

Shown in FIG. 12 is a core 10, adapted for use in the system of FIG. 9, comprising one expander 12 adapted to share the same message schedule with a pair of synchronously operating compressors 14a and 14b. As explained above, each of the compressors 14 starts with a unique mid-state generated using, e.g., our candidate root generation process. As the hash process progresses synchronously downward through the compressors 14, the message schedule words flow in parallel downward through the expander 12. Upon completion, each compressor 14 delivers a respective, unique Out State. As in our basic architecture, the mid-states remain constant over a full nonce range, whereas the nonce inside the message schedule words increments at the full pipeline clock rate. In distinct contrast to a conventional architecture, our hash engine 16' requires only a single, shared expander 12, thereby significantly reducing not just total system hardware but power consumption.

Figure 13:
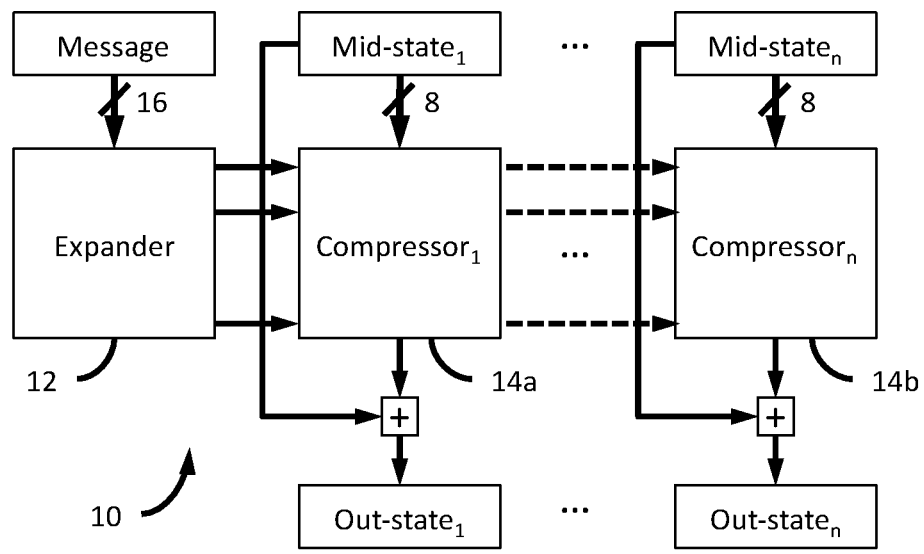
FIG. 13 illustrates, in block diagram form, one possible cascaded, message schedule sharing embodiment in accordance with our invention.

Shown in FIG. 13 is a generic, cascaded core 10, adapted for use in the system of FIG. 9, comprising one expander 12 adapted to share the same message schedule with a plurality of synchronously operating compressors 14a-14b. In this core 10, the several compressors 14 are connected in cascade, with each message schedule element being passed sequentially from compressor to compressor, one delay interval (suitable for the specific hardware implementation) per compressor. Each compressor 14 starts with a unique mid-state and, upon completion, delivers a respective unique Out State; however, the Out States corresponding to the same message are delivered sequentially over time one delay interval apart. Note that this arrangement comprises a carefully coordinated 2-dimensional pipeline with work flowing from top-down and left-right. In operation, every cycle, all of the compressors 14 produce a respective Out State, but for different messages.

Figure 14:
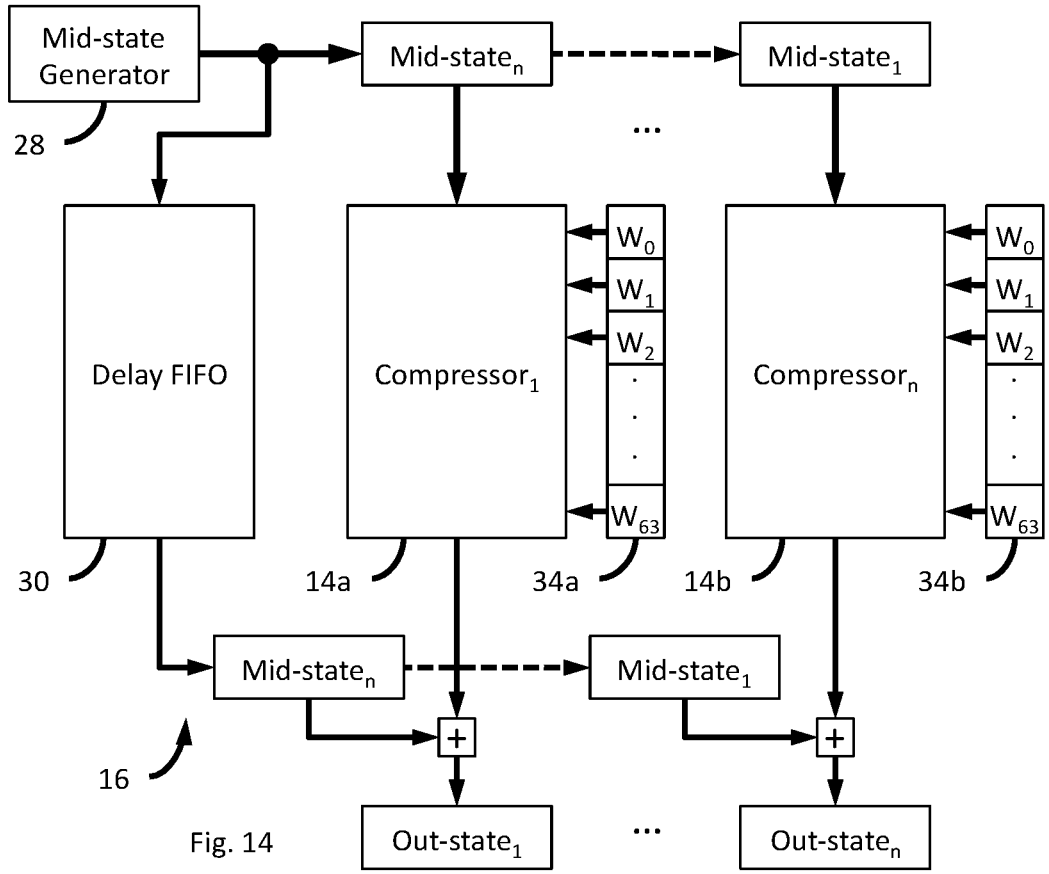
FIG. 14 illustrates, in block diagram form, one alternate parallel, pipelined message schedule pre-computation embodiment in accordance with our invention.
Figure 15A:
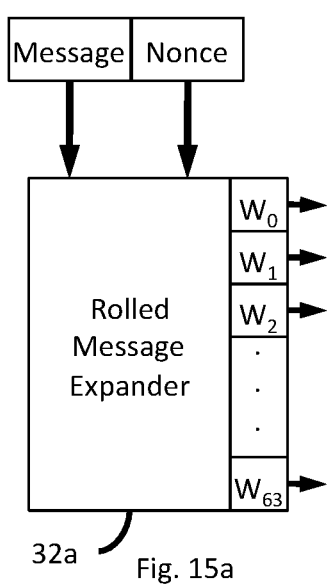
FIG. 15*a* and FIG. 15*b*, illustrates, in block diagram form, possible message schedule pre-computation engines adapted for use, for example, in FIG. 14.
Figure 15B:
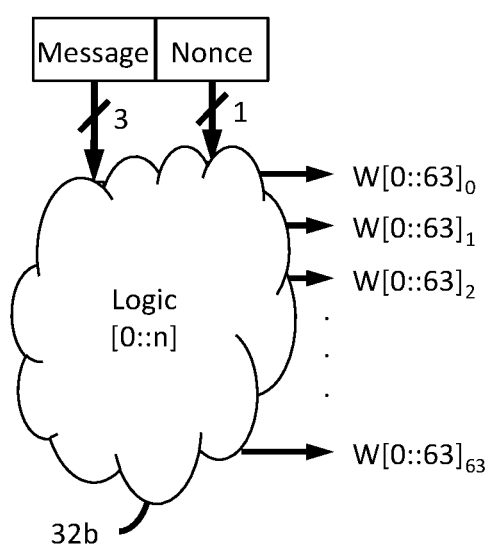

In FIG. 14 we have illustrated a generic, cascaded form of our message schedule pre-computation method, wherein the hash engine 16 comprises a mid-state generator 28 adapted dynamically to generate unique mid-states for each of the plurality of compressors 14, and a 64-stage delay FIFO 30 adapted to delay delivery of the respective mid-states to the final stage of the corresponding compressors 14. The mid-state generator 28 must develop a new mid-state every compressor pipe clock, with each mid-state being passed down the compressor chain at that same pipe clock rate. In this embodiment of our message schedule pre-computation hash engine 16, the message schedule words, $W_0$-$W_{63}$, are dynamically developed by a suitable message schedule pre-computation engine 32, examples of which we have shown in FIG. 15. In hash engine 16, both the message schedule words and the nonce are constant for a relatively long time. In the embodiment shown in FIG. 15a, the output words are stored in a set of 64 message schedule registers 34 associated with each compressor 14. Although we have illustrated in FIG. 15a a single, shared rolled message expander 32a, each compressor 14 has a local rolled message expander 32a (not shown). In the alternate embodiment shown in FIG. 15b, each compressor 14 has a cloud of combinational logic 32b associated therewith adapted to dynamically generate the message schedule words; there is, therefore, no need for the registers 34 in this embodiment. Since the message schedule registers 34 update relatively infrequently, there should be sufficient time for the deep logic 32b to resolve.

Figure 16A:
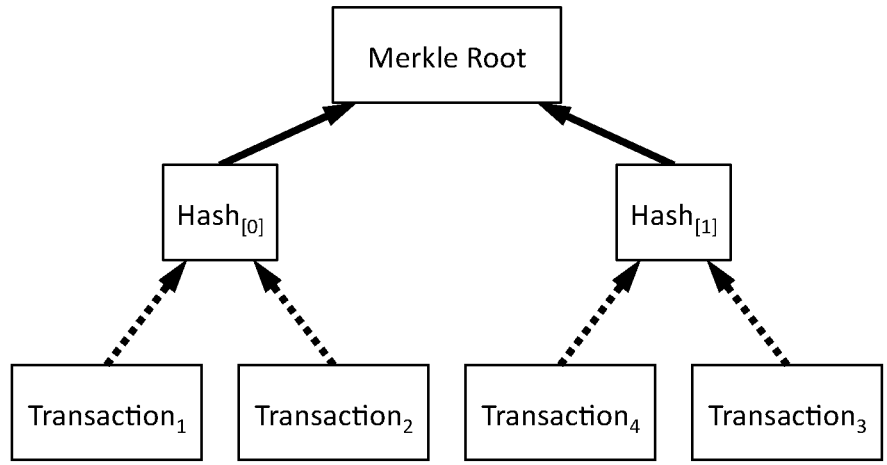
FIG. 16*a* and FIG. 16*b*, illustrates, in block diagram form, several possible forms for the multi-tier Merkle tree of FIG. 7.

In FIG. 16a, we have illustrated, for convenience of reference, the structure of a simple, 3-level binary Merkle tree having 4 leaf nodes, i.e., $Transactions_{[:4]}$. In accordance with our invention, we seek to produce as many candidate root hashes as possible, and then to identify and store those that match in the last dword. In pseudocode form, one approach we refer to as divide-and-conquer ("D&C") works like this:

---

\*\*\*\*\*\*\*\*\*\*
D&C Algorithm:
Input: Q = set of 2^n transactions (i.e., the leaves of the tree).
Output: L = list of k root node hash values.
1. Divide the set of leaves into two sets Q1, Q2 of size 2^(n−1);
2. Produce a list L1 of hash digests where each element is the root node of a Merkle tree built from Q1 by permuting nodes of the tree
3. Produce a list L2 of hash digests where each element is the root node of a Merkle tree built from Q2 by permuting nodes of the tree
    3.1. For all x1 in L1:
        3.1.1. For all x2 in L2:
            3.1.1.1. Compute x = SHA2( x1 || x2) and append to L;
4. Return the list L comprising #L1\*#L2 roots.
\*\*\*\*\*\*\*\*\*\*

---

Figure 16B:
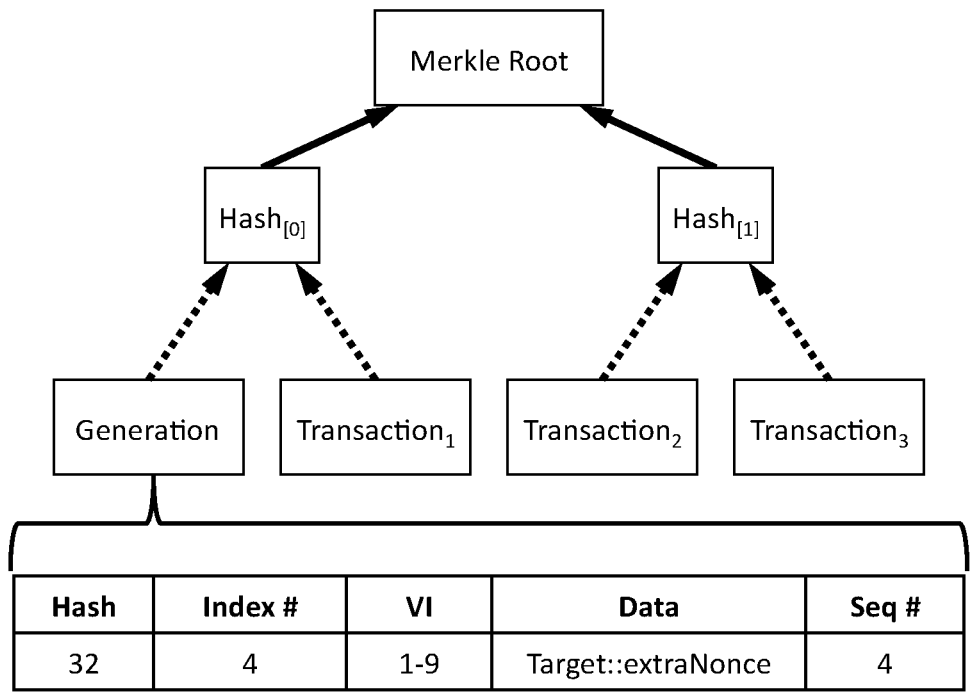
Figure 17:
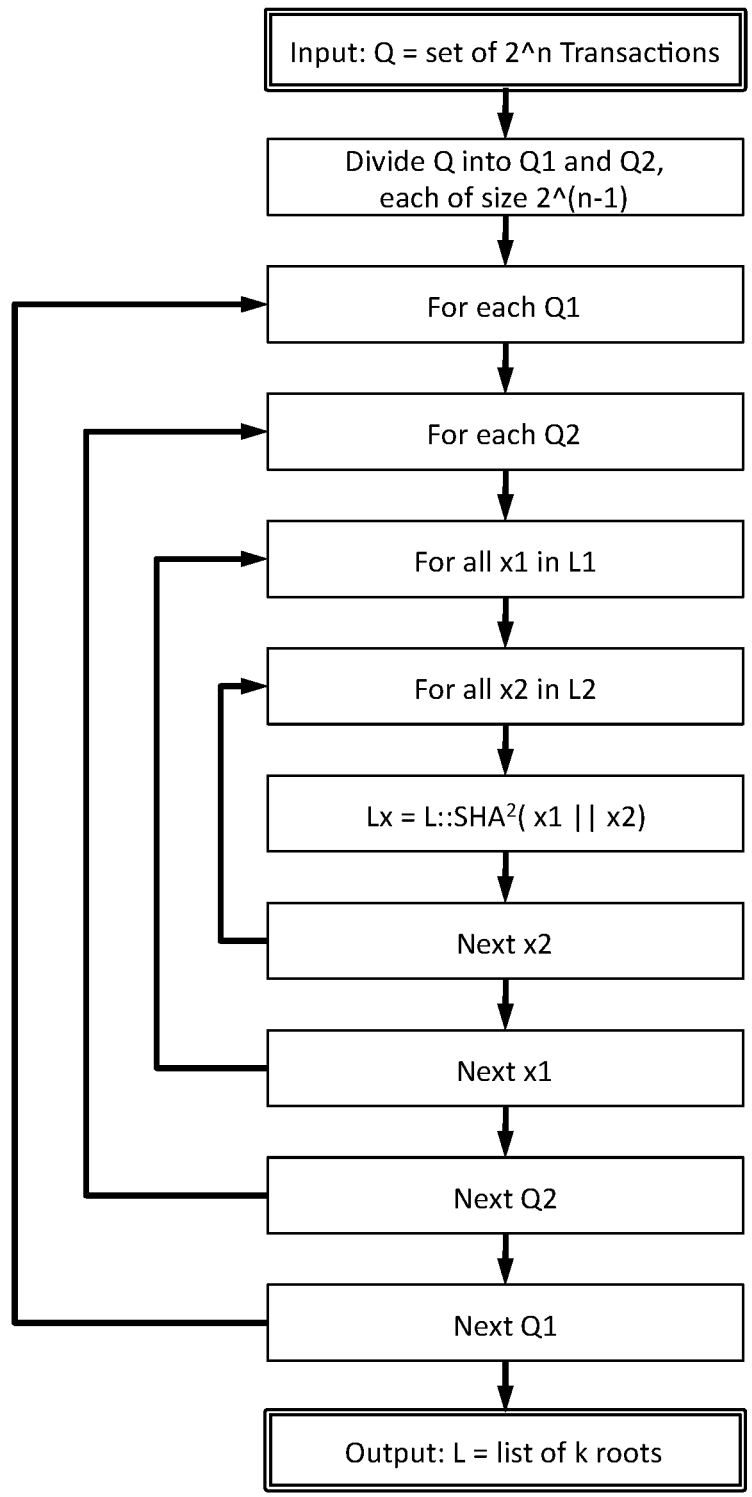
FIG. 17 illustrates, in flow diagram form, one possible method for generating a plurality of Merkle roots in accordance with our invention.

Notes:
1) This flow is illustrated in FIG. 17. In the inner loop step 2.1.1, we denote the append operation using a ": :" symbol.
2) Our basic transaction swapping mechanism is illustrated by way of example in FIG. 16a, wherein $Transaction_3$ in the right sub-tree, Q2, has been swapped with $Transaction_4$ in the right sub-tree, Q2.
3) In FIG. 16b, we have emphasized that the Generation transaction must always be the left-most transaction. Thus, in step 1 of our D&C Algorithm, the Generation transaction is constrained to remain in Q1.
4) Since k1, k2 can be relatively small (requiring on the order of about 1 M list elements), we prefer to implement all but the outer recursion of our D&C Algorithm, i.e., step 2, in the form of a software module residing in the MPU 24. Once developed, L1 and L2 may be forwarded to a pipeline of hash cores 10 to produce the root hashes and then search the list L for roots that satisfy our criteria (on the order of about 1 T list elements).

One alternate approach for quickly developing a set of candidate root hashes is to increment the extraNonce field that is available for use in every Generation transaction (see, FIG. 16b). Since the extraNonce field is variable length from 2 to 100 bytes, a very large pool of candidate root hashes can be easily and rapidly generated simply by using the extraNonce field. Although it has heretofore been proposed to use the extraNonce field to increase the effective nonce range for mining operations, we are not aware of any proposal that the resulting set of root hashes be filtered using a predetermined filter function specially adapted to identify those in which the last 4 bytes match a given criteria, e.g., all zeros or any other given value as we have disclosed in our Provisional Application. The essential benefit of our approach is that only $B_0$ is affected, allowing the message schedule of $B_1$ to be pre-computed. The end goal, remember, is to facilitate our two primary mechanisms: message schedule sharing and message schedule pre-computation.

Figure 18:
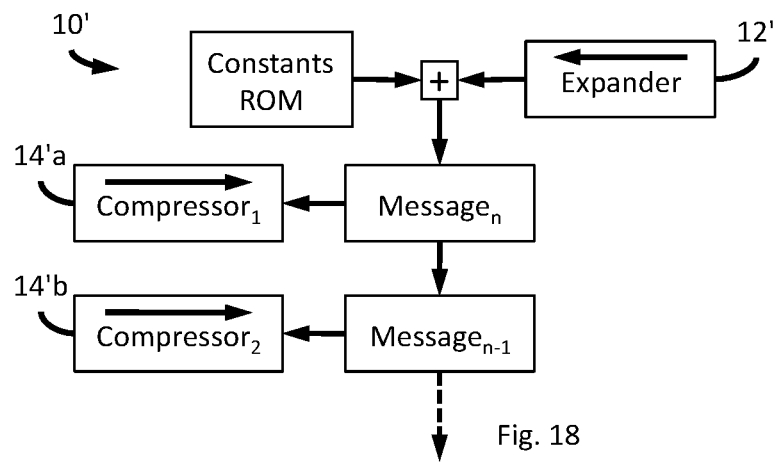
FIG. 18 illustrates, in block diagram form, one possible cascaded, message schedule sharing embodiment, having rolled cores, in accordance with our invention.

In FIG. 18, we have illustrated how we can adapt the rolled core architecture in accordance with our invention to employ our message schedule sharing methodology. In the illustrated core 10', the message schedules developed by a single message expander 12 are applied, in parallel, to a plurality of synchronously operating compressors 14. As in the embodiment of FIG. 12, each of the compressors 14 are initialized with different mid-states; this is effective since new mid-states are required relatively infrequently, generally after the nonce range has been exhausted.

Figure 19:
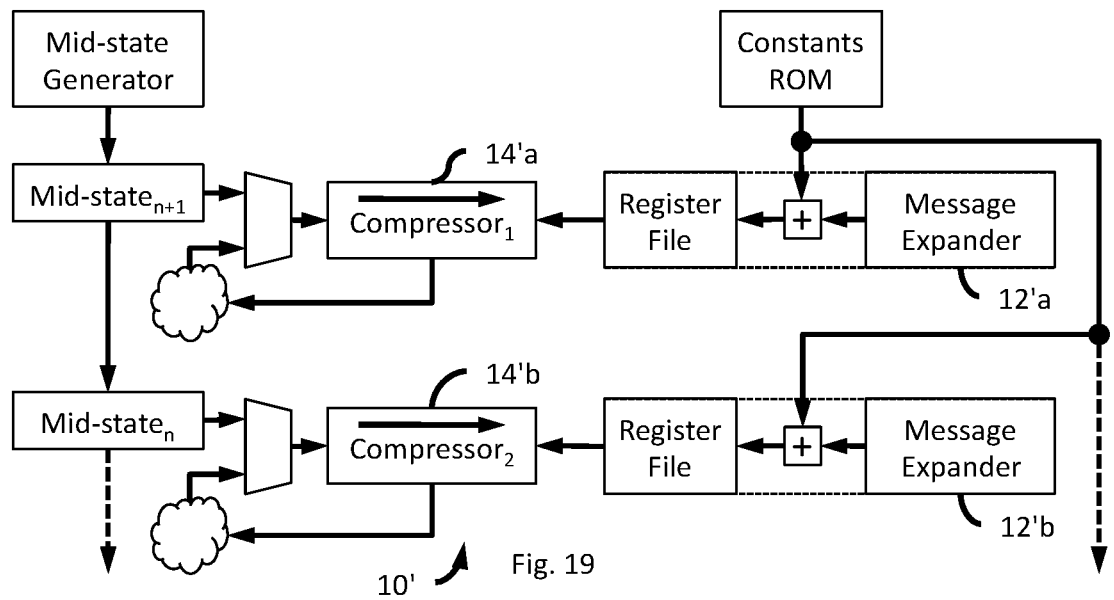
FIG. 19 illustrates, in block diagram form, a message schedule pre-computation embodiment, having rolled cores, in accordance with our invention.

In FIG. 19, we have illustrated how we can adapt the rolled core architecture in accordance with our invention to employ our message schedule pre-computation methodology. In the illustrated core 10', the pre-computed messages are developed by a single message expander 12, and applied, in parallel, to a plurality of cascaded compressors 14. As in the embodiment of FIG. 14, the generated mid-states are cascaded down through a respective set of mid-state registers, via a bus operating at a frequency of approximately core frequency/67. In this embodiment, since the message schedule updates relatively infrequently, we can add the constants and store the pre-computed sums in the register file.

Although we have described our invention in the context of particular embodiments, one of ordinary skill in this art will readily realize that many modifications may be made in such embodiments to adapt either to specific implementations. In the future, if other parts of the Bitcoin block header are made available as expanded nonce space, such as the first 32-bits of the previous block hash, then our methods and apparatus can also make use of this extra nonce space for creating the set of mid-states required by our invention.

Thus it is apparent that we have provided an improved method and apparatus for mining block chains. In particular, we submit our new methods and apparatus allow a single expander instant to be shared by a plurality of compressor instants. Further, we submit that our method and apparatus provides performance generally superior to the best prior art techniques.

What we claim is:

1. A method for mining a block, comprising a block header, as a function of a predetermined hash function applied on the block header, the predetermined hash function comprising an expansion operation and a compression operation, the method comprising the steps of:
   retrieving, by a processing system comprising a processor and memory, a plurality of transactions associated with the block from a ledger stored on a server of a decentralized network, the processing system comprising a single shared expander and a plurality of compressor entities, each being implemented as hardware components in an application specific integrated circuit;
   determining, by the processing system, a plurality of candidate roots from the received plurality of transactions associated with the block, each candidate root including a predetermined pattern;
   developing, by a mid-state generator entity of the processing system, m mid-states, each mid-state being developed from a first portion of one of the plurality of candidate roots, the mid-state generator developing a new mid-state of the m mid-states every compressor entity pipe clock, with each mid-state of the m mid-states being passed down a compressor entity chain at the pipe clock rate;
   distributing the determined plurality of m mid-states to a beginning stage of the plurality of compressor entities;
   performing, by the single shared expander of the processing system using an input of a message and a nonce, the expansion operation on a second portion of each of the plurality of candidate roots to produce a message schedule, the message schedule comprising a plurality of message schedule elements, the single shared expander being provided by a single shared rolled message expander entity;
   distributing the message schedule to the plurality of compressor entities via the single shared expander;
   delaying delivery of the plurality of m mid-states to a final stage of the plurality of compressor entities using a FIFO having a number of stages, the number of stages corresponding to the plurality of message schedule elements of the message schedule;
   for each of the m mid-states, performing, by one of a plurality of compressors of the processing system, the compression operation on a combination of one of the m mid-states and the message schedule, the plurality of compressors being communicatively coupled to the single shared expander and receiving the message schedule from the single shared expander, the compression for each of the m mid-states producing a respective one of m results;
   identifying, by the processing system, a block solution from the m results by comparing each of the m results to a target; and
   providing, by the processing system, the block solution to the ledger stored on the server.

2. The method of claim 1 wherein the first portion of the one of the plurality of plurality of candidate roots comprises an extraNonce field that includes a selected 4 bytes of the block header.

3. The method of claim 1 wherein the first portion of the one of the plurality of plurality of candidate roots comprises a digest of a transaction.

4. The method of claim 3 wherein a generation transaction comprises one of the plurality of transactions; and wherein the determining each of the plurality of candidate roots is performed by varying the generation transaction.

5. The method of claim 3 wherein the determining each of the plurality of candidate roots is performed by varying a selected portion of a selected transaction.

6. The method of claim 3 wherein the determining each of the plurality of candidate roots is performed by varying an order of the plurality of transactions.

7. The method of claim 1 wherein each candidate root comprises a root of a tree data structure.

8. The method of claim 7 wherein the tree data structure comprises a Merkle tree.

9. The method of claim 7 wherein the determining each of the plurality of candidate roots is performed by executing the steps of:
   selecting a left sub-tree hash from a first plurality of candidate sub-tree hashes;
   selecting a right sub-tree hash from a second plurality of candidate sub-tree hashes; and
   developing the root of the tree data structure from the left sub-tree hash and the right sub-tree hash.

10. The method of claim 1 wherein the determining each of the plurality of candidate roots is performed by executing the steps of:
    determining the plurality of candidate roots by applying a filter function to a set of all possible roots, and:
       when a root of the set of all possible roots fails the filter function, discarding the root; but
       when the root passes the filter function, adding the root to the plurality of possible roots, wherein a mid-state is developed for each candidate root to develop the m mid-states.

11. The method of claim 10:
    wherein the first portion of the one of the plurality of candidate roots comprises a first 28 bytes of a 32-byte Merkle root stored within the block and the second portion of each of the plurality of candidate roots comprises a last 4 bytes of the Merkle root; and wherein the filter function is further characterized as selecting a candidate root when the second portion does not comprise the predetermined pattern, the selected candidate roots being subsequently discarded.

12. The method of claim 1 wherein the message schedule comprises an ordered sequence of message schedule elements and wherein the performing the compression operation step is performed by, for each of the m mid-states, compressing the sequence of message schedule elements to produce a respective one of m results.

* * * * *